United States Patent Office 3,676,074
Patented July 11, 1972

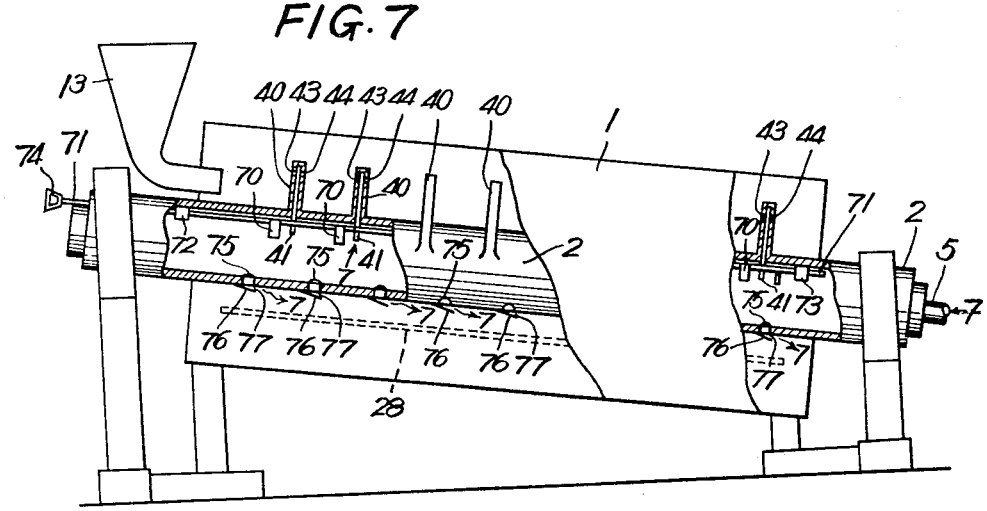
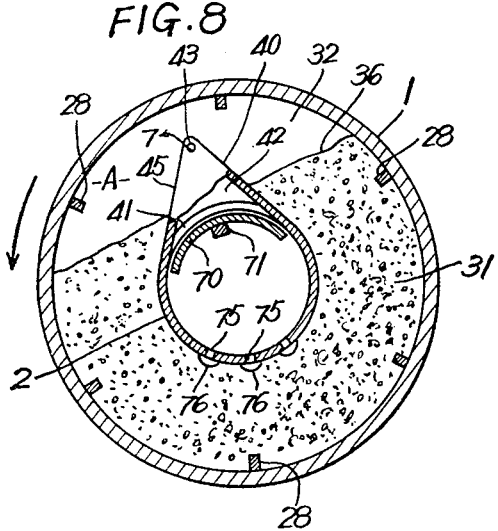
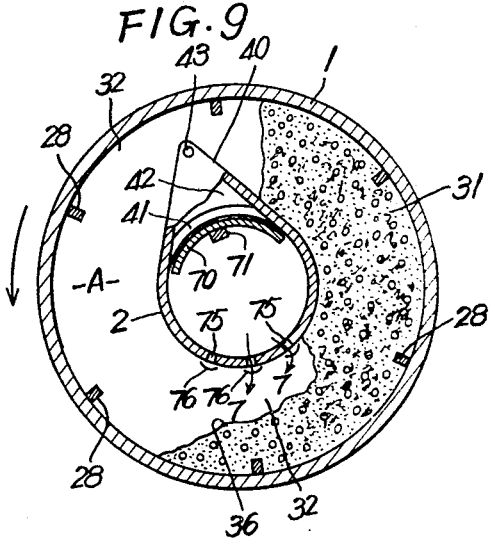

3,676,074
APPARATUS FOR TREATING ORGANIC WASTE
Daigoro Shibayama, Takasaki, and Teruo Mashimo, Annaka, Japan, assignors to Yamato Setubi Koji Kabushiki Kaisha, Maebashi-shi, Japan
Filed May 19, 1970, Ser. No. 38,740
Claims priority, application Japan, June 30, 1969, 44/51,663
Int. Cl. B01j 2/12; C05f 3/06
U.S. Cl. 23—259.1
5 Claims

ABSTRACT OF THE DISCLOSURE

An apparatus for disposal of organic waste such as the excrement of birds and animals and sea food wastes comprising a fixed air pipe having a specific diameter and a cylinder rotatable around the axis of the fixed air pipe, said air pipe having a plurality of air blow-off elements to feed air into the cylinder, or said cylinder being combined with a coaxial inner cylinder rotatable also around the axis of said air pipe, said inner cylinder having a plurality of air jet holes to supply air into the inner cylinder, whereby such organic wastes as excrements and sea food wastes fed into the rotating cylindrical structure are fermented and decomposed by the action of aerobic bacteria and subjected to drying and solidification before being taken out of the cylindrical tank.

BACKGROUND OF THE INVENTION

The present invention relates to an apparatus capable of treating organic wastes such as excreta (substantially feces with a little urine) of birds and animals, especially domestic fowl, cattle, pigs and the like, and wastes from fishery products, as well as human waste.

A large amount of research has been conducted concerning the treatment of excrement of fowl, cattle, pigs and other domestic animals, and sea food wastes, which are discharged in large quantities and difficult to treat, giving rise to public hazards including odor nuisance, and concerning the utilization of the treated organic wastes as manure required in cultivation and gardening. However, such requirements as the beautification of residential quarters and natural circumstances, sanitary mass-disposal, and desirable manure production have never been fully satisfied by any conventional treatment apparatus. The reasons for this are first, that excreta and fish wastes are too sticky and poor in air permeability to undergo sufficient treatment and smell during and after treatment, second, that components of such organic waste matter hasten the corrosion of the apparatus in use, third, that the wastes having undergone treatment contain fertilizing constituents in small quantities and therefore in many cases are not suitable as manure, and fourth, that the treated wastes contain some moisture, which causes inconvenience in the handling thereof.

In order to overcome these disadvantages, incinerators have hitherto been employed to dry such organic wastes. However, the odor nuisance is intolerable and the incinerator corrosion by oxidization is exceedingly large. In addition, the fuel cost for drying by incinerator is high, and the products of the drying disposal are poor in fertilizing components. Thus, the treatment of animal excrements and the like has been troublesome.

The present invention contemplates improving the prior treatment method thoroughly to effect convenient disposal of excretions and sea food wastes, satisfactory stench removal, and production of quick-acting organic manure.

Devising a method of treating excrements and similar organic waste materials by fermentation, this invention provides a waste treating apparatus comprising a fixed air pipe having a specific diameter and a cylindrical structure rotatable around the axis of the air pipe, air being supplied through the air pipe so that the action of bacteria due to air supply urges the fermentation of the organic matter fed in the cylindrical tank. With such a disposal apparatus, however, it is a general trend that animal excrements and fishery wastes, which are moist, viscous and poor in air permeability, are deposited on the outer surface of the air pipe in layers so that the disposal of the deposit during the apparatus operation is troublesome. The deposit may at last be stuck firmly and hardened, with consequent removing trouble and inefficient operation.

The phenomenon of waste deposition on the periphery of the air pipe is to some extent influenced by the viscosity of the waste under treatment and the possible existence of obstacles to air supply. It has however been ascertained through the study and experiment of the present inventors that the deposition is related mainly to the size of the air pipe, the positions of the air blow-off elements and the clearance for air supply in the cylinder, or the volume of the waste matter under treatment. If the diameter of the air pipe in the cylinder tank is excessively small as compared with the cylinder size, the waste material in the vicinity of the inner wall of the cylinder rotates together with the rotating cylinder, thus being stirred and coming into contact with air, while the waste in the center of the cylinder is far slower in rotation than the cylinder because of the viscosity and eventually, without being stirred and much exposed to air, adheres in layers to the circumferential surface of the air pipe, and the thickness of the deposit increases gradually until the deposit gets near the inner wall of the cylinder, this markedly deteriorating the agitating and airing function. On the other hand, the air pipe having an excessively large diameter lessens the treating capacity and brings about insufficient agitation and contact with air, with resultant insufficient disposal.

In view of this fact, the apparatus embodying the present invention controls the air pipe in diameter according to the cylinder size so as to prevent the material under treatment from solidifying like a core in the center of the apparatus, thereby facilitating the treating operation.

SUMMARY OF THE INVENTION

The present invention provides an apparatus comprising a fixed air pipe having a specific diameter and a cylindrical structure rotatable like a rotary kiln around the axis of the air pipe, and organic materials are fed into the cylindrical tank and subjected to fermentation. The diameter of the air pipe is designed to have a specific value falling within a range capable of preventing excreta and sea food wastes fed in the cylindrical tank from adhering and hardening like a thick claylike core centered in the tank. The organic waste supplied in the cylindrical tank is fermented by making use of aerobic bacteria, with the offensive smell prevented from dispersion, and is taken out as granular solid matter containing a small portion of moisture. The resulting granular matter is easy to handle and convenient to transport and can be effectively utilized as manure for cultivation and gardening.

BRIEF DESCRIPTION OF THE DRAWING

FIG. 7 is a front view partly in vertical section showing an apparatus in which an air pipe has air blow-off elements equipped with a shutter, the lower wall of the air pipe being lined with air holes.

FIG. 8 is a sectional view of the cylinder and the air pipe of the apparatus shown in FIG. 7.

FIG. 9 is a schematic view similar to FIG. 8.

Throughout all the figures like parts are indicated by like reference numerals, and since they are similar in structure as well as in function descriptions relating to some such parts are omitted in connection with FIGS. 3 to 9.

DESCRIPTION OF PREFERRED EMBODIMENTS

The present invention contemplates feeding such semifluid and hardly air-permeable organic wastes as animal excrements and sea food wastes into a cylindrical tank to 70 to 80 percent of the cylinder capacity so that a clearance of 30 to 20 percent of the cylinder capacity exists above the waste matter fed in the cylinder and receives the air blown in through a fixed air pipe. By feeding aerobic bacteria simultaneously with the feeding of the waste, the fermentation by bacteria is urged, and the organic matter is decomposed by the action of enzyme Besides, there occurs a heating action, which gradually drives away moisture, thus serving for drying and solidification of the matter being treated. Thus the fermentation of the organic waste in the cylindrical tank causes no substantial odor nuisance, and the gradual solidification by the heating action is effective to produce granular matter containing a very small portion of moisture.

In the apparatus embodying the principle of the invention, air may be supplied into the clearance in the cylindrical tank by means of air blow-off pipes connected to the central air pipe located coaxial with the rotatable cylindrical structure, or flat air blow-off elements fitted to the air pipe, or air jet holes provided in the wall of an inner cylinder, as proposed in the following embodiments. Said air blow-off pipes and said flat elements blow air off in the axial direction or in slanting directions.

Figure 1:
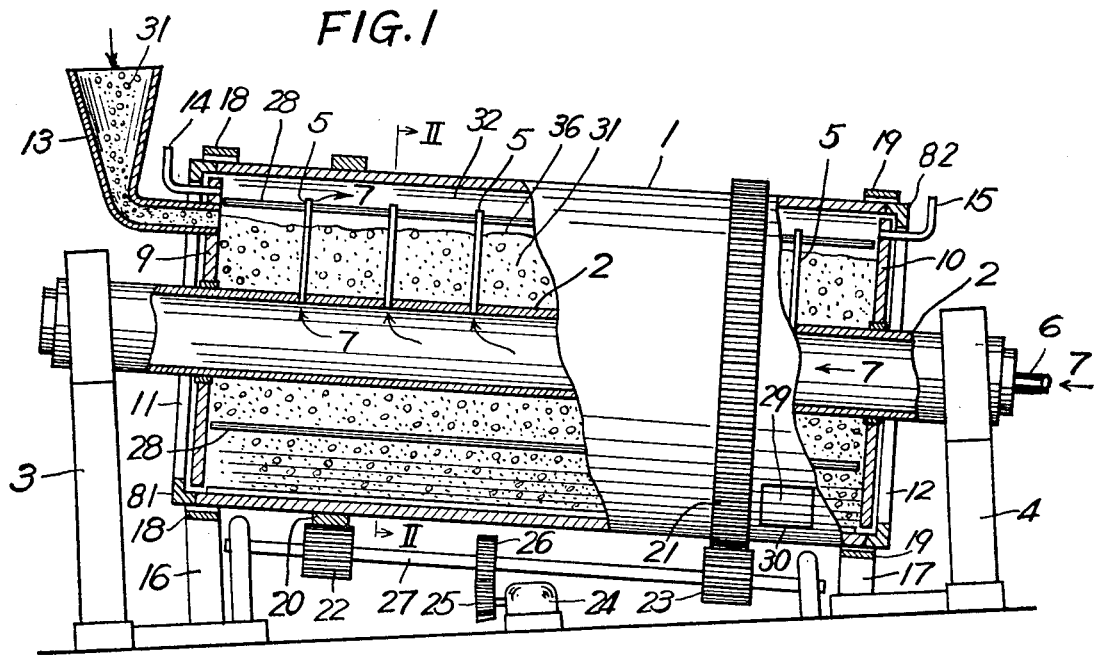
FIG. 1 is a front view partly in vertical section showing the principal part of an apparatus in which a rotary cylinder encases a fixed air pipe having air blow-off pipes.
Figure 2:
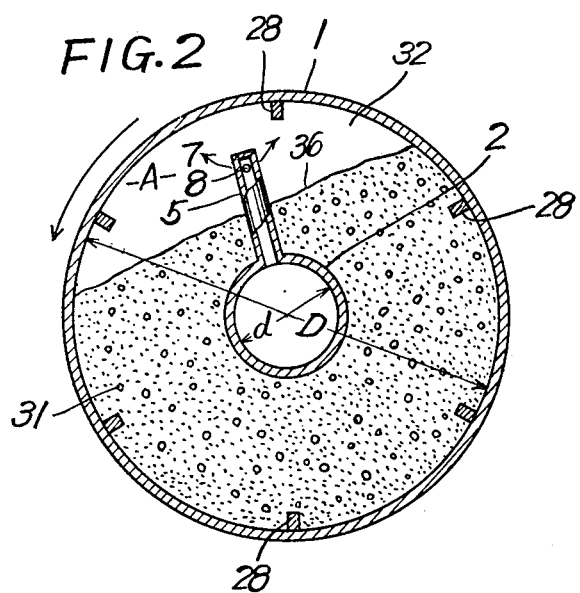
FIG. 2 is a sectional view taken along the line II—II perpendicular to the axis of the cylinder shown in FIG. 1.

EXAMPLE 1.—The apparatus shown in FIGS. 1 and 2

A cylinder 1 is supported so as to be rotatable around the axis of an air pipe 2, which is slantingly fixed to stationary columns 3 and 4. The inclining air pipe 2 is connected at one end with an air conduit 6 for continuous supply of air 7 during the operation of the apparatus. Air blow-off pipes 5 project upward from the air pipe 2 in parallel with one another. The axis of each air blow-off pipe 5 is perpendicular to that of the air pipe 2. Air is sent into the cylinder 1 axially or slantwise through pipe holes 8 provided at the top ends of the air blow-off pipes 5, said holes 8 being directed in parallel with the axis of the air pipe 2. The air pipe 2 is equipped with a disc 9 near one end thereof and with another disc 10 near the other end. Both discs 9 and 10 are coaxially fixed to the air pipe 2 and loosely housed in the rotary cylinder 1 so as to close both end openings 11 and 12 in removeable ring plates 81 and 82 of the cylinder 1. The disc 9, which is positioned higher than the disc 10 as shown, is furnished with a hopper 13 and an exhaust pipe 14 above the hopper 13. The lower disc 10 is also fitted with an exhaust pipe 15 near the top, as required. The cylinder 1 is loosely received at both circumferential ends by receivers 18 and 19 installed on pedestals 16 and 17. Gears 20 and 21 are fitted to the circumferential surface of the cylinder 1 and engage with drive gears 22 and 23, which are revolved by a prime mover 24 through transmission gears 25 and 26 and a shaft 27, thereby rotating the cylinder 1. The rotating speed is preferably 5 to 8 turns per hour. A plurality of lifting crosspieces 28 are firmly attached to the inner wall of the cylinder 1 in parallel with the cylinder axis. The cylinder 1 is provided near the bottom with an outlet 30 having an access cover 29.

A slight amount of aerobic bacteria is added to waste matter 31 such as animal excrements (containing little urine) and sea food wastes before the waste matter 31 is supplied into the apparatus. The bacteria-enriched waste matter 31 is first fed into the hopper 13 and proceeds into the rotating cylinder 1. In accordance with the rotation of the cylinder 1, the waste matter 31 advances spirally, being lifted and stirred by the lifting crosspieces 28 and lowered on the other side. In order to prevent the waste 31 from being deposited on the periphery of the air pipe 2 and to effect sufficient rotary agitation and contact with air, the air pipe 2 should be designed to have a specific diameter. This is an outstanding feature of the invention, being common with the succeeding examples, and therefore will be described in more detail hereinafter. If the air pipe 2 has a diameter $d$ and the cylinder 1 has a diameter $D$, it is desirable in view of operational efficiency that the air pipe diameter is expressed as $$d = D - \frac{2A}{D}$$

where $A$ stands for the sectional area of the clearance 32 in the cylinder 1. However, the larger the air pipe diameter $d$, the less the supply rate of the waste to be treated. Therefore, from an economical viewpoint, it is preferable to employ the formula $$d = \frac{2}{3}\left(D - \frac{2A}{D}\right)$$

Of course this may vary somewhat according to the viscosity and moisture content of the waste matter to be treated. As the moisture content of the waste matter increases in excess of 65 percent, the viscosity also increases. However, when 75 percent is exceeded, the waste becomes so fluid that the viscosity decreases. The waste matter has substantially no air permeability. Hence the fermentation treatment is not easy. Nevertheless, by previously installing a central tubular or cylindrical body having the size of a waste core which might otherwise be formed in the center of the cylinder, the waste matter fed between the inside wall of the cylinder and the tubular body is revolved along with the cylinder by the rotating force given by the cylinder wall and the lifting crosspieces and raised up to the vertical center line. After passing the line the waste matter collapses in blocks, so that the total surface area becomes markedly larger. The blocks accumulate after falling down. While collapsing, the waste comes into contact with the air forced into the clearance, thus making rapid progress in fermentation. The fermentation is accompanied by heat generation, which helps the evaporation of the moisture contained in the waste under treatment, thereby drying the waste. In this invention, the air pipe 2 serves as the above described tubular body corresponding to the core. The pipe holes 8 of the air blow-off pipes 5 projecting in parallel from the air pipe 2 are bored in the axial direction. Therefore, air 7 coming out of said pipe holes 8 proceeds substantially perpendicularly or obliquely with regard to the collapsing waste blocks. The resultant large air contact area is effective to promote fermentation and hasten drying.

When the waste material to be treated is fed into the cylinder up to about 70 percent of the cylinder capacity, leaving an about 30 percent clearance 32, and the cylinder is turned slowly counterclockwise as indicated by an arrow in FIG. 2, the waste is raised by means of the lifting crosspieces 28. The heightened waste falls down immediately after passing the vertical center line. If the moisture content is above 50%, the waste matter does not fall with ease. However, after passing the vertical center line, the material breaks off and falls down. The waste is broken into lumps while falling down and thereafter accumulates. In this process, the waste is much exposed to the air in the clearance, thus advancing in fermentation.

It is now assumed that there is a cylinder rotating without the existence of a central air pipe. As the rotation continues, the waste material is broken and, on contact with air, proceeds in fermentation. At the same time however, a columnar core of waste matter is formed in the center of the cylinder. The columnar core grows until the core diameter reaches a certain value. Then, the core becomes so hard as to have no air permeability and therefore can not undergo fermentation. The reason for the core formation is as stated below. Although the waste matter near the wall of the cylinder rotates together with the cylinder by the rotating force given by the crosspieces and the cylinder wall, the rotating force of the waste near the center is much smaller, and the waste in the center remains motionless. This is because the tendency of the waste toward retaining the same position by gravity and the resisting force of the waste by viscosity join together into a force, which in the cylinder center surpasses the rotating force received from the rotating cylinder wall and crosspieces. As the rotation of the cylinder proceeds, the waste near the cylinder wall comes into good contact with air and undergoes smooth fermentation and therefore becomes less viscous and less capable of transmitting the revolving force of the cylinder to the waste in the center, thus urging the formation of the columnar core. The core formation can be prevented by previously providing a central tubular body corresponding in size to the core, and the diameter of the tubular body can be expressed as $$d = D - \frac{2A}{D}$$

as disclosed already. Hence, the air pipe is designed in accordance with this formula.

Since the air pipe has such a diameter, the waste matter 31 to which aerobic bacteria has been added is agitated without accumulating on the circumference of the air pipe 2 and fermented in the cylinder, while rotating with the aid of the crosspieces 28 fitted to the inner wall of the cylinder, as illustrated in FIG. 2. The cylinder is not perfectly full of the waste matter rotating along with the cylinder, so that there always exists the clearance 32 in the upper portion of the cylinder interior. In the clearance 32, the waste mater 31 is stirred and exposed to the fresh air spurting from the air blow-off pipes 5 connected to the air pipe 2, whereby the growth and action of bacteria are spurred, resulting in accelerated fermentation. The stirred waste moves in the rotating direction, passing between the air blow-off pipes without stagnation. For smooth movement of the waste matter, it is effective to tilt the air blow-off pipes 5 with respect to the vertical plane taken along the cylinder axis in such a way that the top ends of the pipes 5 are somewhat advanced in the rotational direction of the cylinder, as seen in FIG. 2. It is also effective to direct the pipe holes 8 in parallel with the cylinder axis as described hereinbefore. The fermentation of the waste matter gives rise to heating at 60 to 70° C. Therefore the waste under treatment is fermented to a satisfactory extent in about 3 days and gradually solidified by moisture ejection. The bad smell is eliminated almost completely by the action of aerobic bacteria, and the exhaust air is discharged through the exhaust pipes 14 and 15. As the waste matter to be treated is supplied in succession, the waste thus solidified is forced gradually toward the outlet 30 and eventually taken out of the cylinder at the outlet 30. Preheating the air to be forced into the air conduit 6 is also effective for urging the heat evolution by fermentation, and especially preferable in the cold season.

The waste material thus subjected to the decomposing treatment is almost odorless. Besides, the heat generation above 60° C. is sufficient to kill parasites. When fowl droppings are treated, the product has a nitrogen content of 3.2 to 3.8 percent, a phosphate content of 3.8 to 4.2 percent, and a potassium content of 2.1 to 2.5 percent, being solidified by moisture evaporation. The resulting solid matter is broken into particles of suitable size, for example about 3 millimeters in diameter. The particles are filtered or otherwise treated to serve as quick-acting organic manure. Example 2. The apparatus shown in FIGS. 3 and 4.

Figure 4:
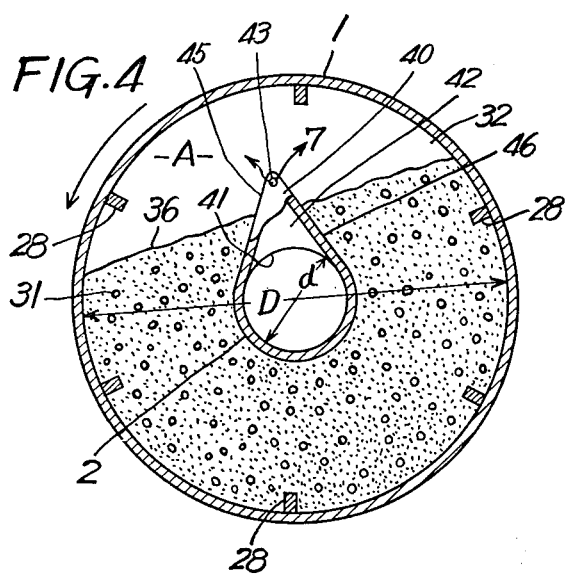
FIG. 4 is a sectional view taken along the line IV—IV perpendicular to the axis of the cylinder shown in FIG. 3.

This apparatus is the same as that of the preceding example except that a change is made in the air blow-off means connected to the air pipe 2. That is, the air blow-off pipes 5 in the foregoing example is replaced by flat air blow-off elements 40, each of which is a triangular body having a hollow 42 and sides 45 and 46 and fixed to the air pipe 2. The sides 45 and 46 join at the top and extend tangentially with regard to the periphery of the air pipe 2. At the bottom of the triangular body, a slit 41 made in the wall of the air pipe 2 opens into the hollow 42. The flat air blow-off element 40 is provided with one or two air jet holes near the top. In this example, two air jet holes 43 and 44 are made in both flat walls of the triangular body, both holes being directed in parallel with the cylinder axis. Since the sides 45 and 46 are narrow, the sticky waste matter may not accumulate on the flat air blow-off elements 40, sliding off and collapsing successively without stagnation. Thus the waste can undergo desired agitation and keep on smooth sprial movement. It is preferable that the flat air blow-off elements 40 are also tilted with respect to the vertical plane taken along the cylinder axis, as shown in FIG. 4.

The other components of the apparatus are identical in construction and function with those employed in the preceding example.

Figure 5:
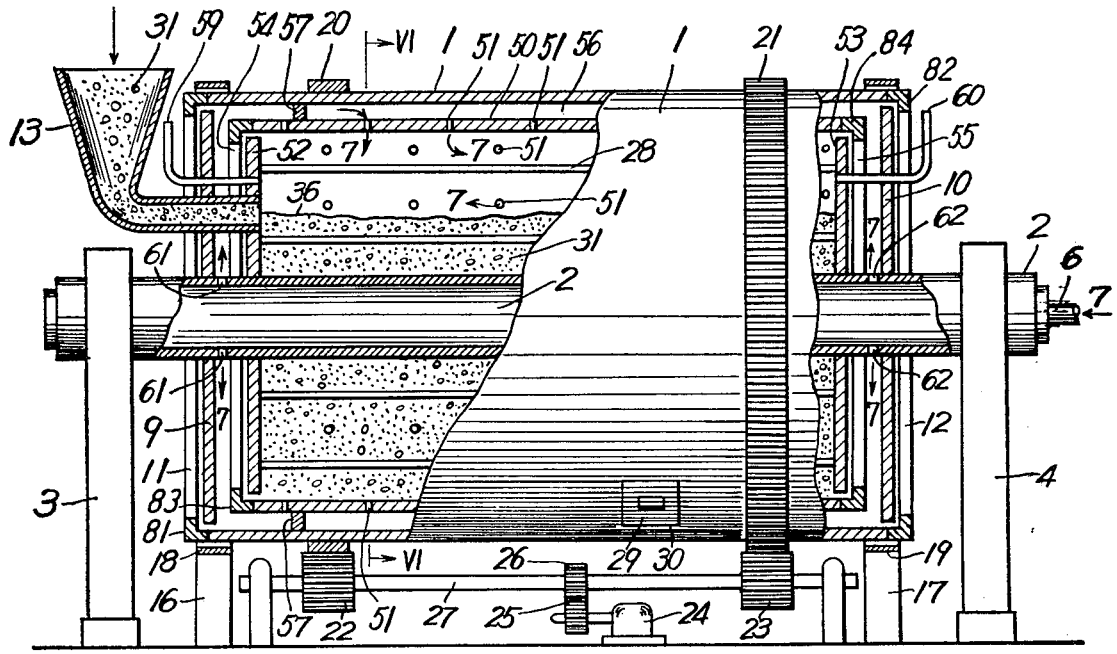
FIG. 5 is a front view partly in vertical section showing the principal part of an apparatus in which an outer cylinder houses a coaxial inner cylinder having air jetting holes.
Figure 6:
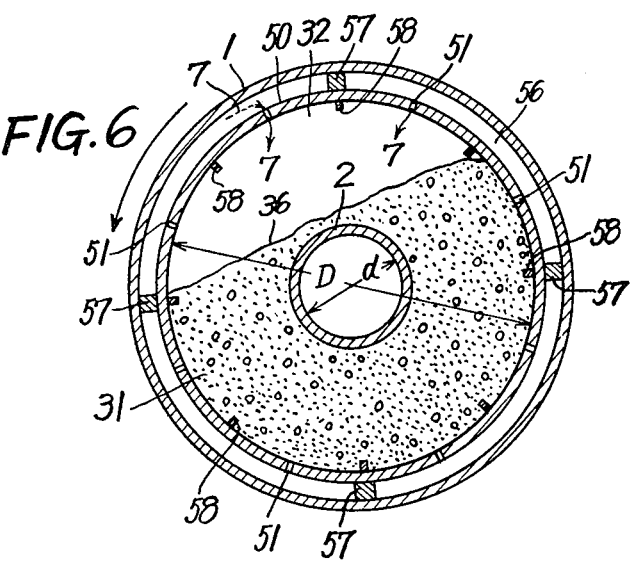
FIG. 6 is a sectional view taken along the line VI—VI perpendicular to the axis of the coaxial cylinders shown in FIG. 5.

EXAMPLE 3.—The apparatus shown in FIGS. 5 and 6

In this apparatus, the cylinder used in the foregoing two embodiments houses another cylinder having a wall provided with air holes for feeding air all over the surface of the waste matter under treatment. Here follows a description with reference to FIGS. 5 and 6.

The cylinder 1 rotates around the axis of the air pipe 2, which is set horizontally or may be inclined as in the preceding examples. As described before, the discs 9 and 10, which are relatively large in diameter, are coaxially fixed to the air pipe 2 near both ends of the pipe. Small discs 52 and 53, which are somewhat smaller in diameter than the discs 9 and 10, are also coaxially fastened to the air pipe 2 inside and near the discs 9 and 10. Just as the discs 9 and 10 are housed loosely in the rotary cylinder 1, the small discs 52 and 53 are loosely encased in an inner cylinder 50 having a multiplicity of air holes 51, so that the end openings 11 and 12 of the cylinder are closed by the discs 9 and 10 while both end openings 54 and 55 in the removeable ring plates 83 and 84 of the inner cylinder 50 are closed by the small discs 52 and 53. A hollow space 56 is provided between the cylinder 1 and the inner cylinder 50. Both cylinders 1 and 50 are firmly combined by means of a plurality of support pieces 57 placed between both cylinders. Thus, the inner cylinder 50 rotates together with the cylinder 1. The air pipe 2 is provided with air jet holes 61 and 62, the hole 61 between the disc 9 and the small disc 52 and the hole 62 between the discs 10 and 53. The air 7 in the air pipe 2 jets through these air jet holes 61 and 62 and flows into the hollow space 56 and then spurts into the inner cylinder 50 through the air holes 51 made in the wall of the inner cylinder. The small disc 52 is equipped with a hopper 13 opening into the inner cylinder and with an exhaust pipe 59. The other small disc 53 is also furnished with an exhaut pipe 60. The cylinder 1 is revolved by means of the prime mover 24 just as in the preceding examples, being accompanied by the rotation of the inner cylinder 50. A plurality of lifting crosspieces 58 are firmly fitted to the inside wall of the inner cylinder 50 in parallel with the cylinder axis.

As in the preceding examples, a slight amount of aerobic bacteria is added to the organic material 31 to be treated. The material 31 is thereafter fed into the hopper 13 and proceeds into the rotating inner cylinder 50. As the inner cylinder 50 keeps on rotating, the waste material 31 advances gradually toward the outlet side, while stirred by the lifting crosspieces 58 and fermented by the action of the added aerobic bacteria. Since the waste material is fed into the inner cylinder up to about 70 to 80% of the capacity, there exists the clearance 32, which is supplied with much air through the air pipe 2, the air jet holes 61 and 62, the hollow space 56 and the air holes 51 made in the wall of the inner cylinder 50 all over the periphery. The air blown off into the clearance 32 comes into contact with the surface 36 of the material 31. Meanwhile, being turned and agitated, the material 31 collapses into blocks as in the preceding examples. Therefore almost all material surfaces are exposed to air. Hence the growth and motion of bacteria are urged, with consequent promotion of fermentation. The waste material thus treated is solidified and taken out of the inner cylinder at the outlet 30 provided near the bottom of the cylindrical tank.

EXAMPLE 4.—The apparatus shown in FIGS. 7, 8 and 9

Figure 3:
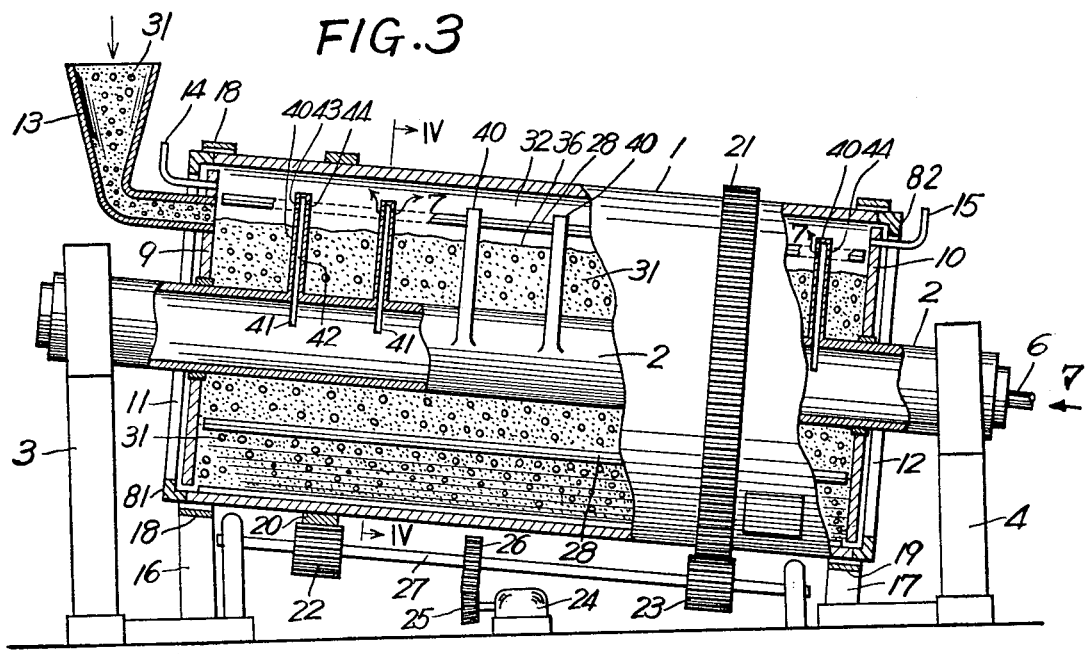
FIG. 3 is a front view partly in vertical section showing the principal part of an apparatus in which a cylinder encases an air pipe having flat air blow-off elements.

This apparatus is identical with the apparatus shown in FIGS. 3 and 4 except that the air pipe is provided inside with a shutter for opening and closing the slits 41 of the air blow-off elements 40 and that the lower wall of the air pipe is lined with air holes which pass air for drying the material.

The construction and tilting of the cylinder 1, the supply of air 7 into the air pipe 2, and so forth are the same as in Example 2, and therefore need not be explained here.

A skewer rod 71 is furnished with arc-sectional shutter plates 70 for opening and closing, from inside, the slits 41 provided in the air blow-off elements 40 of said air pipe 2. The skewer rod 71 is held so as to be able to slide by means of holders 72 and 73 fixed near both ends of the air pipe 2. A handle 74 is externally provided to operate said skewer rod for opening and closing the slits 41. Furthermore, air holes 75 are bored in lines in the lower portion of the wall of the air pipe 2. The lines of the air holes 75 are arranged in a regular or zigzag pattern. As shown in FIG. 7, cover plates 76 having rear openings 77 are provided to cover said air holes 75.

As has been described in the foregoing examples, the waste material 31 solidified and formed into blocks in the cylinder 1 successively collapses downward below the air pipe 2, as seen in FIG. 9, and deposits on the inner wall of the cylinder 1 by gravity and the rotation of the cylinder. Thus, it is so designed that the deposit is formed apart from the lower wall surface of the air pipe so that the clearance 32 extends between the air holes 75 and the surface 36 of the material 31. Said air holes 75 blow off air 7 when the skewer rod 71 is shifted in such a way that the shutter plates 70 fixed to the skewer rod 71 close the slits 41 of the air blow-off elements 40. At the initial stage of material treatment, the air pipe is entirely surrounded by the material so that the air supplied through the air holes 75 is slight in amount. However, as the treatment proceeds, the material falls down and allows the clearance to extend in the lower zone as shown in FIG. 9. Therefore, air 7 comes out of the air holes 75 and dries the material, thus promoting solidification and block formation. Since the air holes 75 are provided with the cover plates 76 having the rear openings 77 to prevent the material from closing the air hole 75 and to direct the air axially or slantwise, the air stream dries the surface 36 of the material having fallen down successively.

As will be apparent from the foregoing description of the embodiments, the apparatus of the present invention causes substantially no odor nuisance since such semifluid organic materials as animal excrements and sea food wastes are treated by fermentation in a cylindrical tank which is almost closed up. Therefore, flies do not swarm during the treating operation. Besides, the waste treatment produces solidified matter easy to handle and is therefore economical in actual practice. Furthermore, it is to be noted here again that the axial air pipe is designed to have a specific diameter suitable for preventing semifluid excreta and fish wastes from firmly adhering like clay to the circumferential wall of the air pipe.

What we claim is:

1. An apparatus for the disposal of organic waste comprising an air pipe, air blow-off pipes fitted to the air pipe, a cylinder rotatable around the axis of the air pipe, discs provided on the air pipe near both ends perpendicularly to the axis of the air pipe, said discs sealing the ends of said cylinder, a hopper fitted to one of the discs to receive said organic waste, air inlet and exhaust pipes fitted to the discs, outlet means in said cylinder for said waste, and means for rotating said cylinder, said air pipe having a diameter at least large enough to prevent caking of said waste on said pipe while said cylinder is rotating, said air blow-off pipes being triangular flat air blow-off elements, said flat air blow-off elements being directed perpendicularly to the axis of the air pipe and having sides extending tangentially with respect to the periphery of the air pipe, said air blow-off elements being provided with air jet holes directed in parallel with the axis of said air pipe.

2. An apparatus as set forth in claim 1, wherein said air pipe has a maximum diameter according to the formula $$d = D - \frac{2A}{D}$$

wherein $d$ is the diameter of said pipe, D is the diameter of said cylinder, and A is the percentage of the annular space between said pipe and said cylinder left unfilled with said waste.

3. An apparatus as set forth in claim 2, wherein $$d = \tfrac{2}{3}\left(D - \frac{2A}{D}\right)$$

4. An apparatus as set forth in claim 1 and wherein the air blow-off elements of the air pipe are provided with a shutter and also the lower portion of the wall of the air pipe is provided with air holes.

5. An apparatus for the disposal of organic waste comprising a fixed air pipe, air jet holes in the pipe wall, large discs provided on the air pipe near both pipe ends, small discs provided on the air pipe spaced between the large discs and having therebetween a plurality of crosspieces for agitation in parallel with the axis of the air pipe, an outer cylinder housing the large discs loosely, an inner cylinder housing the small discs loosely and having air holes therein, the outer and inner cylinders defining a hollow space between both cylinders and being rotatable around the axis of the fixed air pipe, a hopper fitted to the large and small discs on one side and opening into the inner cylinder for receiving and passing said organic materials, exhaust pipes fitted to the large and small discs, air being supplied to the inner cylinder through the air pipe, the air jet holes, the hollow space and the air holes in the wall of the inner cylinder, and discharged through the exhaust pipes, outlet means for said waste, and means for rotating said cylinders, said air pipe having a diameter at least large enough to prevent caking of said waste on said pipe while said cylinders are rotating.

References Cited

UNITED STATES PATENTS

| | | | |
|---|---|---|---|
| 535,560 | 3/1895 | Schmiedecke et al. | 34—138 |
| 2,241,734 | 5/1941 | Petersen | 71—9 |
| 2,587,639 | 3/1952 | Miley | 23—279 |
| 2,954,285 | 9/1960 | Carlsson et al. | 23—259.1 X |
| 910,407 | 1/1909 | Morse | 23—259.3 |

JAMES H. TAYMAN, Jr., Primary Examiner

U.S. Cl. X.R.

23—259.3, 286; 195—142; 34—122, 130, 138, 128, 139; 71—9, 11, 21, 16